United States Patent [19]

Lockitt et al.

[11] Patent Number: 4,918,623

[45] Date of Patent: Apr. 17, 1990

[54] TESTING THE PERFORMANCE OF A COMMUNICATION LINE BETWEEN TWO MODEMS USING MODEM PROCESSOR

[75] Inventors: John A. Lockitt, Sherborn; Kelly A. Lyndon, Boston; Robert M. Wilson, Walpole; Bruce C. Giese, Rockland, all of Mass.

[73] Assignee: Codex Corporation, Mansfield, Mass.

[21] Appl. No.: 262,108

[22] Filed: Oct. 19, 1988

Related U.S. Application Data

[63] Continuation of Ser. No. 784,212, Oct. 4, 1985, abandoned.

[51] Int. Cl.⁴ .............................................. G06F 11/00
[52] U.S. Cl. ..................................... 364/514; 371/20.3; 371/20.6; 375/10; 379/6; 379/22
[58] Field of Search ............... 364/514; 371/22; 379/4, 379/6, 14, 28, 22, 31; 375/10; 370/85.1, 110.1; 178/2 A, 2 D, 2 E

[56] References Cited

U.S. PATENT DOCUMENTS

| | | | |
|---|---|---|---|
| 3,826,908 | 7/1974 | Weathers et al. | 235/153 R |
| 3,956,601 | 5/1976 | Harris et al. | 179/175.3 R |
| 4,112,264 | 9/1978 | Abramson et al. | 179/175.3 R |
| 4,112,414 | 9/1978 | Iscol et al. | 371/22 |
| 4,273,955 | 6/1981 | Armstrong | 178/69 |
| 4,311,882 | 1/1982 | Johner et al. | 371/22 |
| 4,351,059 | 9/1982 | Gregorie et al. | 371/22 |
| 4,381,546 | 4/1983 | Armstrong | 364/514 |
| 4,385,384 | 5/1983 | Rosbury et al. | 371/22 |
| 4,419,751 | 12/1983 | Cholat-Namy et al. | 370/110.1 |
| 4,449,247 | 5/1984 | Waschua, Jr. | 375/10 |
| 4,459,436 | 7/1984 | Rubin | 379/6 |
| 4,467,148 | 8/1984 | Stafford | 379/6 X |
| 4,545,013 | 10/1985 | Lyon et al. | 364/200 |
| 4,580,016 | 4/1982 | Williamson | 379/31 |
| 4,654,807 | 3/1987 | Bremer | 375/10 X |
| 4,729,126 | 3/1988 | Olek | 379/22 |
| 4,766,594 | 8/1988 | Ogawa et al. | 371/22 |
| 4,807,274 | 2/1989 | Kousa | 371/22 |

FOREIGN PATENT DOCUMENTS 2088170 6/1982 United Kingdom .................. 379/28

Primary Examiner—Parshotam S. Lall
Assistant Examiner—Joseph L. Dixon
Attorney, Agent, or Firm—Fish & Richardson

[57] ABSTRACT

Apparatus for testing the performance of a communication line that carries customer data between two modems, including a programmable processor (for example, a digital signal processor) in each modem that either performs modulation or demodulation of customer data or tests the line, and a controller (for example, a programmable host processor) that switches the programmable signal processor selectively between processing customer data and line testing. The communication line carries both customer data and network control commands that include a test command for initiating testing, and each host processor responds to the test command by switching the signal processor to the test mode. There are a plurality of modems forming a data network and a central network control system connected to the network for providing the test command. The test command names two of the modems to participate in the testing and the controller identifies whether a given modem is one of the participants. The controller causes all of the modems to cease processing customer data while the testing is in progress. The network carries progress signals while the testing is in progress. The controller causes all modems other than the two modems to monitor the network for the progress signals and to again process customer data when the progress signals cease to appear.

21 Claims, 6 Drawing Sheets

| Step | Data Network Control System 18 | Modem A | Modem B |
|---|---|---|---|
| 1. | ------- | Passing Date | Passing Data |
| 2. | Sends Test Command to Modems A & B | Passing Data & Accepts Command | Passing Data & Accepts Command |
| 3. | Requests Test Status from A until Test is "done". | Passing Data & Delay | Passing Data & Delay |
| 4. | ------- | Shutdown Data & FSK. | Shutdown Data & FSK. |
| 5. | ------- | Load 1st Test Program into Signal Processor. | Load 1st Test Program into Signal Processor. |
| 6. | ------- | Transmit 1004 Hz Tone. Receive 1004 Hz Tone. Measure SNR. Measure Phase Jitter. Stop 1004 Hz Tone. Measure C Msg. noise. | Transmit 1004 Hz Tone. Receive 1004 Hz Tone. Measure SNR. Measure Phase Jitter. Stop 1004 Hz Tone. Measure C Msg. noise. |
| 7. | ------- | Transmit Frequency Sweep Tone Sequence. Measure Amplitude Distortion at each Frequency. Stop Frequency Sweep. | Transmit Frequency Sweep Tone Sequence. Measure Amplitude Distortion at each Frequency. Stop Frequency Sweep. |
| 8. | ------- | Load 2nd Test Program into Signal Processor. | Load 2nd Test Program into Signal Processor. |
| 9. | ------- | Start 83-1/3 AM Frequency Sweep. Measure Envelope Delay for each Frequency. Stop 83-1/3 AM Frequency Sweep. | Retransmit modulated 1800Hz Tone.  Stop retransmitting modulated 1800Hz Tone. |

FIG. 3A

| | | | |
|---|---|---|---|
| 10. | ------- | Retransmit modulated 1800Hz Tone. | Start 83-1/3 AM Frequency Sweep. Measure Envelope Delay for each Frequency. |
| | | Stop retransmitting modulated 1800Hz Tone. | Stop 83-1/3 AM Frequency Sweep. |
| 11. | ------- | Transmit Harmonic Distortion Test Tone Sequence. Calibrate HD. Measure HD. Stop HD Test Tone Sequence. | Transmit Harmonic Distortion Test Tone Sequence. Calibrate HD. Measure HD. Stop HD Test Tone Sequence. |
| 12. | ------- | Load Modem Software into Signal Processor. | Load Modem Software into Signal Processor. |
| 13. | ------- | Start passing Data & Restore FSK. | Start passing Data & Restore FSK. |
| 14. | ------- | Pass Data & Respond to Network Controller That the Test is Done. | Pass Data |
| 15. | Request Test Results from Modem A. | Pass Data & Report Results. | Pass Data. |
| 16. | Request Test Results from Modem B. | Pass Data. | Pass Data & Report Results. |
| 17. | Display Test results to operator. | Pass Data. | Pass Data. |

FIG.3B

TESTING THE PERFORMANCE OF A COMMUNICATION LINE BETWEEN TWO MODEMS USING MODEM PROCESSOR

This is a continuation of co-pending application Ser. No. 784,212 filed on Oct. 4, 1985 now abandoned.

BACKGROUND OF THE INVENTION

This invention relates to testing the quality of a data communication channel, e.g., a telephone line linking two modems.

Testing for poor line quality not only helps to identify problems that may prevent data from being sent accurately and rapidly, but also may give a basis for a telephone company refund for lines that do not meet the specific minimum line quality standards set out in the telephone tariffs.

Modems typically are capable of monitoring customer data received over the line to give a rough qualitative indication of line performance. Armstrong, U.S. Pat. No. 4,273,955, shows including in the same chassis as the modem an auxiliary processor to test the line without interfering with transmission of customer data. The tests are directed from and the results are returned to a central network controller via an FSK channel separate from the main PSK communication channel.

One way to make the more detailed standard measurements of line quality that are specified by the tariffs is to use a testing machine and a technician at each end of the line. The line is taken out of service and the two technicians (who are in voice communication) test the line first in one direction, then in the other, using special test signals rather than customer data.

Abramson, U.S. Pat. No. 4,112,264, discloses a tester that is associated with but distinct from each modem to perform quantitative testing using special test signals in response to commands that are sent from a central site over a different transmission link (e.g., a direct distance dialed telephone line) from the data carrying transmission link.

SUMMARY OF THE INVENTION

A general feature of the invention is line testing apparatus that includes a programmable signal processor in each modem that either modulates and demodulates customer data carried over the line (in accordance with a data program) or tests the line (in accordance with a test program), and a controller that selectively causes the signal processor to switch between processing of customer data and line testing.

Preferred embodiments include the following features. The programmable processor is a digital signal processor in each modem, and the controller includes a programmable host processor in each modem connected to the digital signal processor. The communication line carries both customer data and network control commands that include a test command for initiating testing, and each host processor responds to the test command by switching the signal processor to test mode. There are a plurality of modems forming a data network and a central network control system connected to the network for providing the test command. The test command names two of the modems to participate in the testing and the controller identifies whether a given modem is one of the participants. The controller causes all of the modems to cease processing customer data while the testing is in progress. The network carries progress signals while the testing is in progress. The controller causes all modems other than the two modems to monitor the network for the progress signals and to again process customer data when the progress signals cease to appear. The passage of customer data and network control signals is temporarily discontinued beginning after the test command is received. The network control commands include a clear test command and one modem responds to the clear test command by passing a clear test indication (by dropping the carrier for a period) over the line to the other modem. The test command is provided from, and the test results are returned to, a central network control system. The line is a telephone line that carries the customer data in phase shift keyed form in a channel above 600 Hz, and the network commands in frequency shift keyed form in a channel below 500 Hz. The testing applies to both channels. The processor performs the modulation and demodulation digitally and the testing includes test signal tones that the processor also generates digitally. Each of the two modems sends synchronizing signals to the other to synchronize the testing and each modem controls the testing based on the synchronizing signals received from the other modem. The test signal tones follow the synchronizing signals by a delay longer than the transmission delay that characterizes the line. The line carries channels in both directions which are tested simultaneously. The testing includes a plurality of quantiative tests.

The invention eliminates the need for independent test equipment by taking advantage of the processing capacity of the available modem signal processor and the control capability of the available host processor. Testing can be controlled by commands sent over the same line as the customer data. Quantitative tests are performed quickly and accurately. The tests can be triggered from and the results returned to a central location. The tests are automatically synchronized notwithstanding line delays. Modems not participating in the test automatically stop processing customer data during the test and resume customer data processing when the test is completed. Testing proceeds in both directions simultaneously.

Other advantages and features will become apparent from the following description of the preferred embodiment, and from the claims.

DESCRIPTION OF THE PREFERRED EMBODIMENT

We first briefly describe the drawings.

Drawings

FIGS. 3A, 3B are a state table for the test mode of the network of FIG. 1.

FIG. 6 is a timing chart of the tests performed in both directions over a line.

STRUCTURE AND OPERATION

Figure 1:
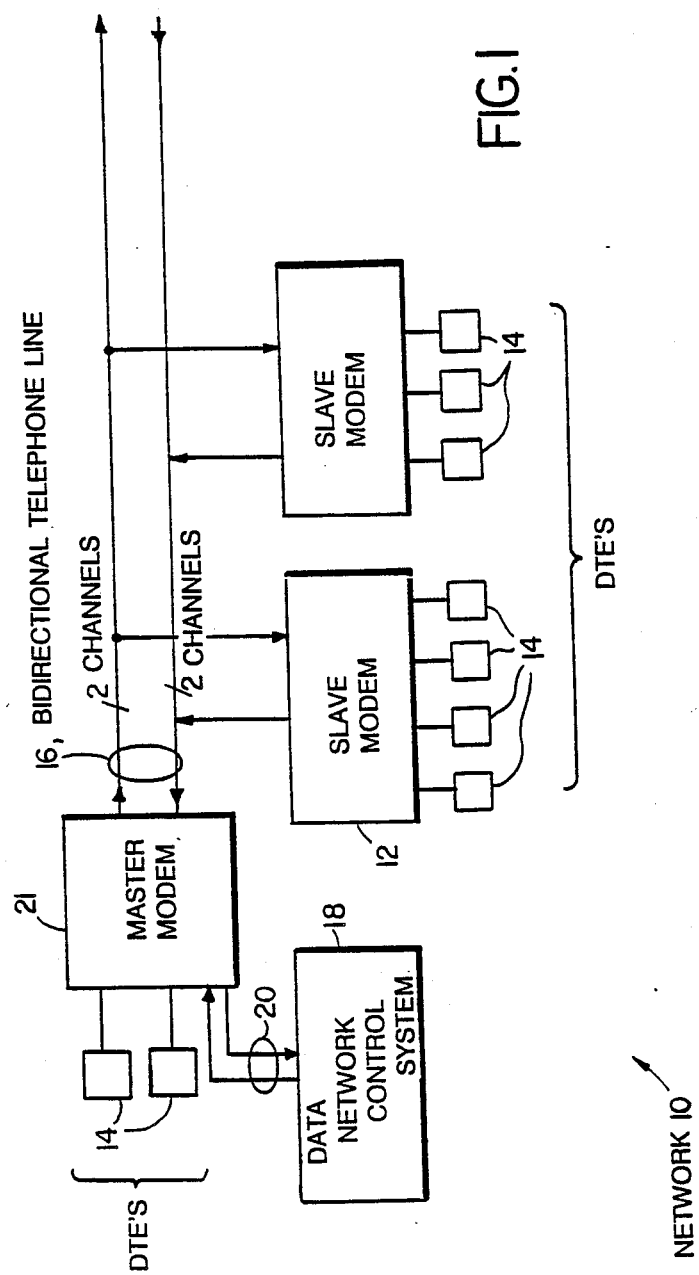
FIG. 1 is a block diagram of a data communication network.

Referring to FIG. 1, in a multi-point data communication network 10, each modem 12 serves one or more data terminal equipment (DTEs) 14. A data network control system (DNCS) 18 is connected via a network control line 20 to one of the modems 21 (called the master modem) to provide control commands to and to receive status information from the other (slave) modems in the network. DNCS 18 also provides an interface to a network operator. Data can be sent back and forth between a DTE connected to the master modem and a DTE connected to a slave modem via their respective modems over a two-way telephone line 16. Telephone line 16 carries both customer data, and network control commands and status information, in both directions between the modems that it serves.

Figure 2:
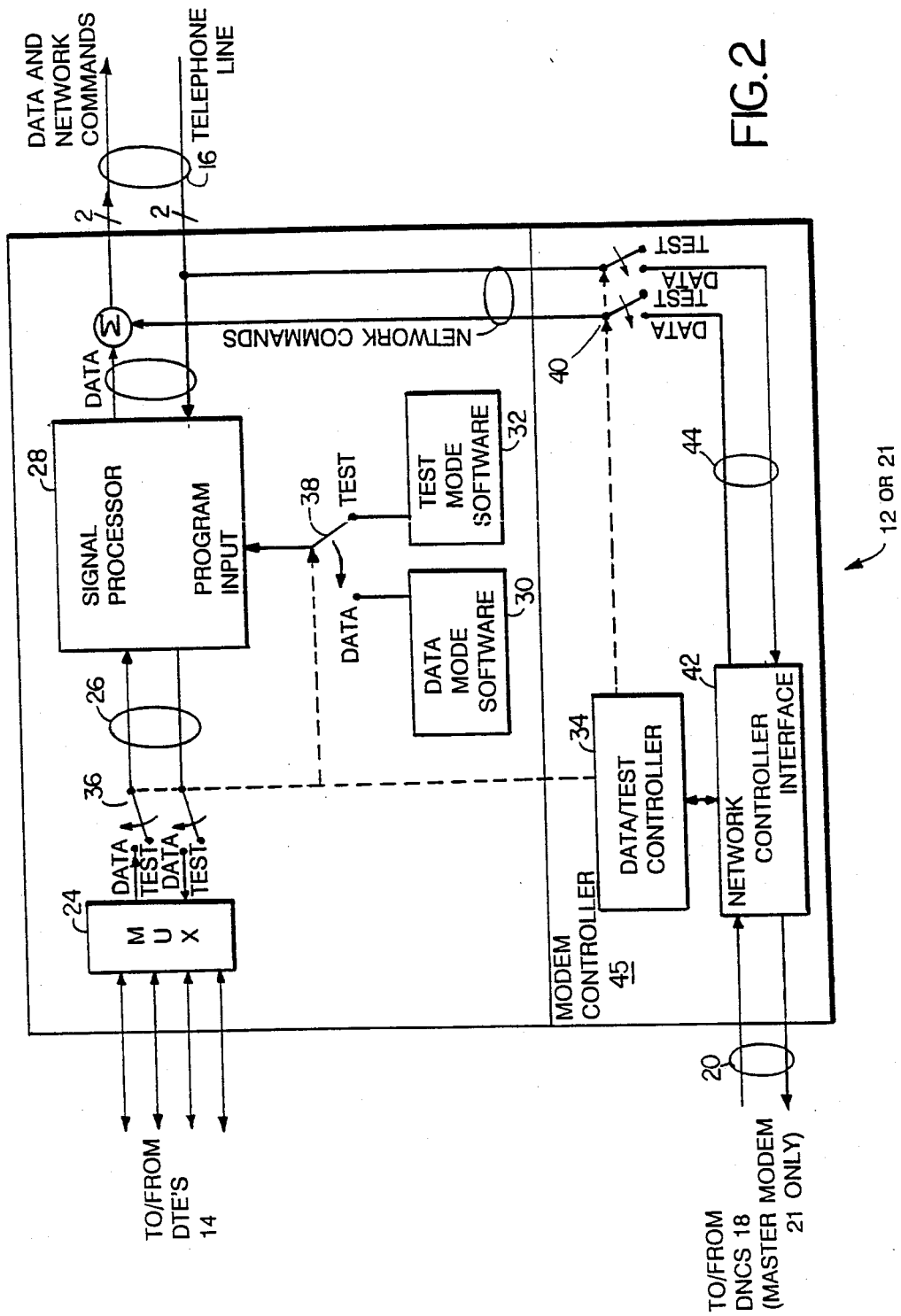
FIG. 2 is a block diagram of one modem of the network of FIG. 1.

Referring to FIG. 2, the master and each slave modem includes a multiplexer 24 that is connected to the DTEs serves by that modem and multiplexes the data flowing to and from the DTEs onto a bidirectional line 26 connected to a signal processor 28. Signal processor 28 is also connected to telephone line 16. Signal processor 28 can be of the kind disclosed in U.S. patent application Ser. No. 586,681, filed Mar. 6, 1984 now abandoned and continued as Ser. No. 07/147,109 filed Jan. 21, 1988, assigned to the same assignee as this application, and incorporated herein by reference.

Modem 12 is arranged to operate in either of two modes, one a conventional data mode, the other a test mode for measuring the quality of the telephone line. Both modes are implemented using the same signal processor 28 by selectively using either data mode software 30 or test mode software 32. Which mode is in effect at a given time is controlled by a data/test controller 34 that triggers switches 36, 38, 40 to occupy either a test position or a data position. Software 32 can be stored either permanently in nonvolatile memory (i.e., ROM or EPROM) or temporarily in volatile memory (i.e., RAM), in which case it must be down-line loaded from the DNCS 18 before the test can begin, via either the customer data channel 20 (in the case of the master modem) or the network control channel over the telephone line (in the case of a slave modem).

When switches 36, 38, 40 are in the data position, customer data passes back and forth over line 26 between multiplexer 24 and signal processor 28, and back and forth over telephone line 16, all in the usual manner. Switch 38 connects the data mode software into the program input of the signal processor to cause it to perform the usual modem functions on the customer data, including modulation, demodulation, equalization, filtering, sampling, and gain control.

When switch 36 is in the test position, multiplexer 24 is disconnected from signal processor 28 thus interrupting the processing of customer data. Switch 38, when in the test position, connects the test software 32 into the program input of signal processor 28, which then performs the telephone line tests.

Four-wire telephone line 16 is arranged to carry both a customer data channel and a low rate frequency shift-keyed (FSK) network control channel. The main channel is carried within a band between about 600 and about 3000 Hz and the network control channel is carried within a band between about 300 and about 500 Hz.

While in data mode, modem 12 processes both customer data passed over the main data channel and network control commands and status information passed over the network control channel. Each modem includes a network controller interface 42 that is connected by a switch 40 to the network control channel via line 44 during data mode and is disconnected during test mode. During test mode the entire band from about 300 Hz to about 3200 Hz is tested.

Control 34, interface 42, line 44, and switch 40 together make up a modem controller 45.

Controller 34, interface 42, switches 36, 40, and multiplexer 24 are all implemented as part of a host processor (Motorola 68000) which interfaces with signal processor 28 in the manner disclosed in U.S. patent application Ser. No. 586,681 now Ser. No. 07/147,109, cited above.

In the master modem to which the DNCS 18 is directly connected, the DNCS 18 is connected via the network controller interface of that modem.

The network controller interface 42 is connected to controller 34 to trigger switching between data and test modes.

The DNCS 18, the network control interfaces in the modems, and the FSK channel together make up a network control system in which the DNCS sends commands to the modems over the network control channel concerning, for example, data speeds or types of modulation. In each modem the network controller interface receives the network control channel, interprets the commands received, and passes them to other circuits in the modem. Likewise each modem can return status information to the DNCS via its network controller interface. During testing, the network control channel between the modems involved in the test is temporarily terminated.

Referring to FIGS. 3A, 3B, and 6, when a test of the line in both directions is to be performed between the master modem and one of the slave modems, one of the two modems (modem A) is designated arbitrarily to be a test master for synchronization purposes. The other (modem B) is designated a test slave. The test may be initiated from the DNCS as part of routine maintenance or as a result of alarms received at the DNCS from circuit quality monitoring systems in the respective modems that qualitatively monitor customer data on a non-interfering basis. Alternatively, the test may be initiated by an operator from the front panel of the modem itself, for example when that modem's circuit quality monitoring system indicates an alarm condition. The following test steps occur.

In step 1, before the test is requested, modems A and B are both in data mode, passing customer data. In step 2, DNCS 18 sends a test command via the network control channel to both modems A and B to initiate the test. Both modems continue passing data, and accept the test command. In step 3, DNCS 18 begins to request the test status from modem A over the network control channel and continues to do so until the test is done. Meanwhile both modems continue to pass data.

In step 4, the data/test controllers in both modems cause them to shut down both the data and network control channels in preparation for performing the test, by throwing switches 36, 38, 40. Neither customer data nor network control commands can be sent over the line between the modems during the test, which lasts approximately 10 minutes. In step 5, the first program of the test mode software is loaded into he signal processor of each modem.

In step 6, the actual test begins. The line is tested in both directions simultaneously. Modem A and modem B each sends a 1004 Hz tone 200 and waits for a 1004 Hz received carrier. All tones sent during testing are generated digitally by signal processor 28. Each modem receives the 1004 Hz tone sent from the other modem and them measures the signal-to-noise ratio 202 (using a notched noise method) and the phase jitter 204. Both modems then stop sending the 1004 Hz tone, and measure C message noise 206.

In step 7, each modem transmits a frequency sweep tone sequence for discrete frequencies from 504 to 3304 Hz in 100 Hz increments, and the other modem measures the amplitude distortion 208 at each frequency, normalized to 1004 Hz. Then the frequency sweeps are stopped.

In step 8, a second test program of the test software is loaded into the signal processors of both A and B modems. Steps 9 and 10 are identical except that the roles of the two modems are reversed. One modem starts an 83⅓ AM frequency sweep. The other modem retransmits the modulated 1800 Hz tone back to the first modem. The first modem measures the envelope delay 210 for each frequency. The first modem stops the sweep and the second modem stops retransmitting.

In step 11, both modems transmit an harmonic distortion test tone sequence, both modems calibrate and measure the harmonic distortion 212 based on the power level of the intermodulation product of four pilot tones, then both modems stop the harmonic distortion test tone sequence. This completes the test.

Each modem sends synchronizing signals 214 to the other before the signal-to-noise ratio test, the amplitude distortion test, the envelope delay test, and the harmonic distortion test, and after the harmonic test. Each modem watches for the other modem's synchronizing signals so that the testing will occur in synchronism. The test is self-synchronizing as between the two modems participating in the test. This is accomplished by providing an interval of time after each synchronizing signal before the next test begins. The interval is long enough to give the other modem time to receive and act on the synchronizing signal notwithstanding the fact that the synchronizing signal may be subject to substantial line delays (possibly including satellite hops) in reaching the other modem.

In step 12, both modems are switched back to the data mode and the data mode software is loaded into their respective signal processors. In step 13 both modems resume passing customer data and restore the FSK channel to operation. In step 14, modem A reports back to DNCS 18 that the test is done. In steps 15 and 16, the DNCS requests the test results that have been stored in each modem and the results are reported over the network control channel. In step 17, the DNCS reports the test results to the operator. The DNCS stores the values of test parameters specified in the tariffs, and the results of the test can be displayed to the operator either by displaying both the tested values and the tariff values, by displaying comparisons of the tested values and tariff values, with exception conditions being noted, or by graphically displaying test values against tariff values. The reported information may also be printed at the DNCS.

While the test is in progress, the operator at the DNCS can ask the modem that remains connected to the network control channel for its status and the other modem will respond that a test is in progress. The other modem that is participating in the test cannot be queried since it has been cut off from the network control channel.

Also, while the test is in progress, the two modems can be returned to the data mode after the operator sends a clear test command to the one modem that can be reached on the network control channel. Likewise, the modems will return to data mode automatically if the test has not been completed within a certain timeout period, which is clocked in both modems.

When a clear test command is received by one modem, it communicates that command to the other modem by dropping carrier for an interval longer than any normal quiescent period. The modem that detects the extended carrier loss will execute a clear test procedure that includes turning the network control channel back on.

Figure 4:
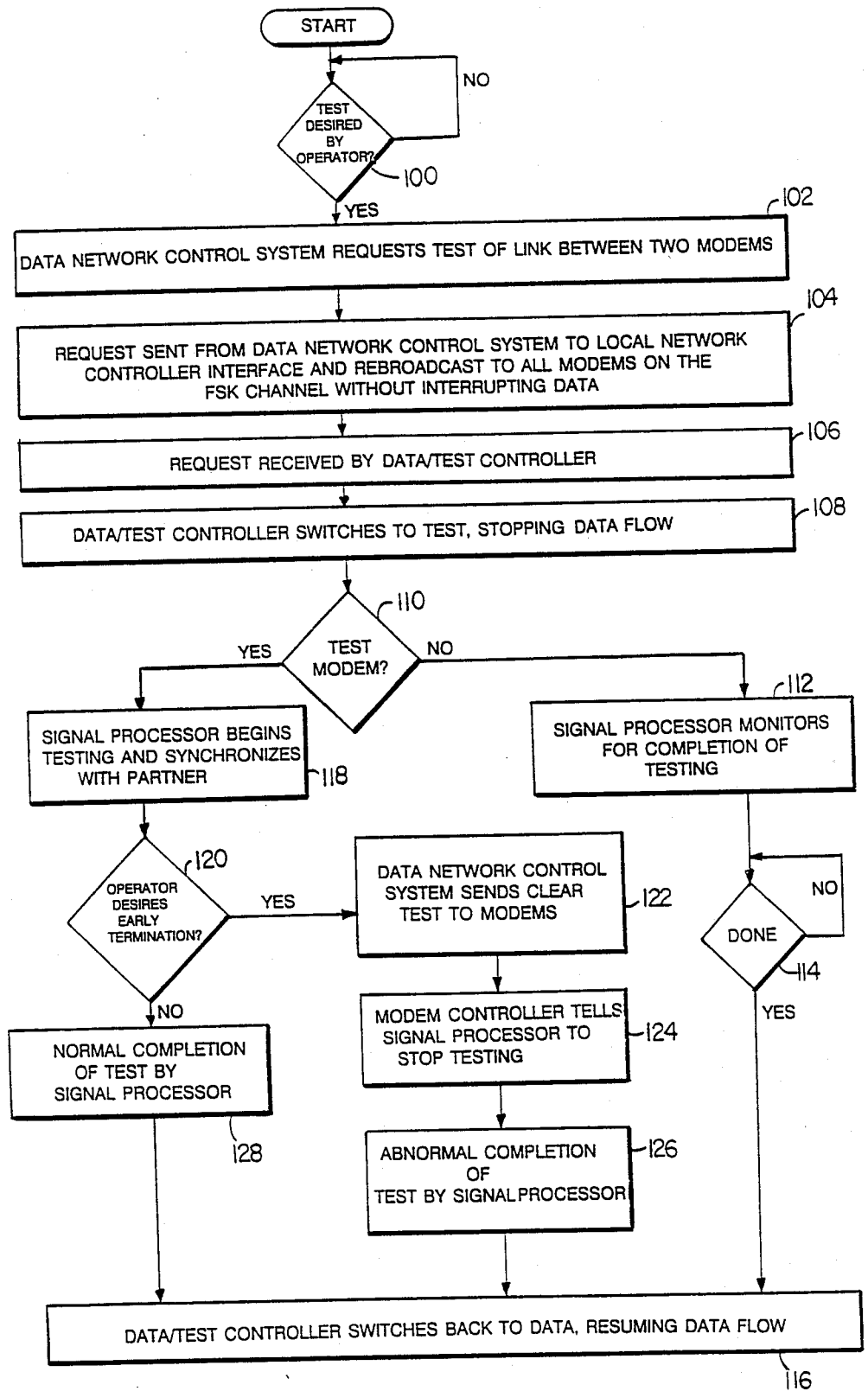
FIG. 4 is a flow chart of the operation of the testing system.

Referring to FIG. 4, the sequence of operations in performing a test requested by the operator begins with awaiting the indication by the operator that a test is to be performed (100). When that indication appears, the DNCS requests a test of the communication link between two modems (102). The request is sent to each modem's network controller interface and then re-broadcast to all modems on the data communication line via the FSK channel, without interrupting data (104). The request is requeced by each local data/test controller (106) which switches to test mode, stopping data flow (108). Each modem determines from the test command whether it is to be a participant in the test (110). If not, that modem's signal processor continues to monitor the line watching for periodic synchronizing signals that are part of the test (112) in order to determine if the test is done (114). When no more synchronizing signals appear for an interval that is longer than a predetermined time out, the non-participating modem assumes that the tests is done, and its data/test controller switches back to data, resuming data flow (116).

On the other hand, if the local modem is to participate in the test, its signal processor begins the testing and exchanges synchronizing signals with the other participant of the tests (118). While the test is in progress, if the operator orders the test to be stopped (120), the data network control system sends a clear test to the modems (122), the modem controller tells the signal processor to stop testing (124), the signal processor performs an abnormal completion of the test (126) and the modems switch back to normal data flow (116). If the operator does not terminate the test prematurely, the signal processor completes the test normally (128) and the modems resume normal data flow (116).

Figure 5:
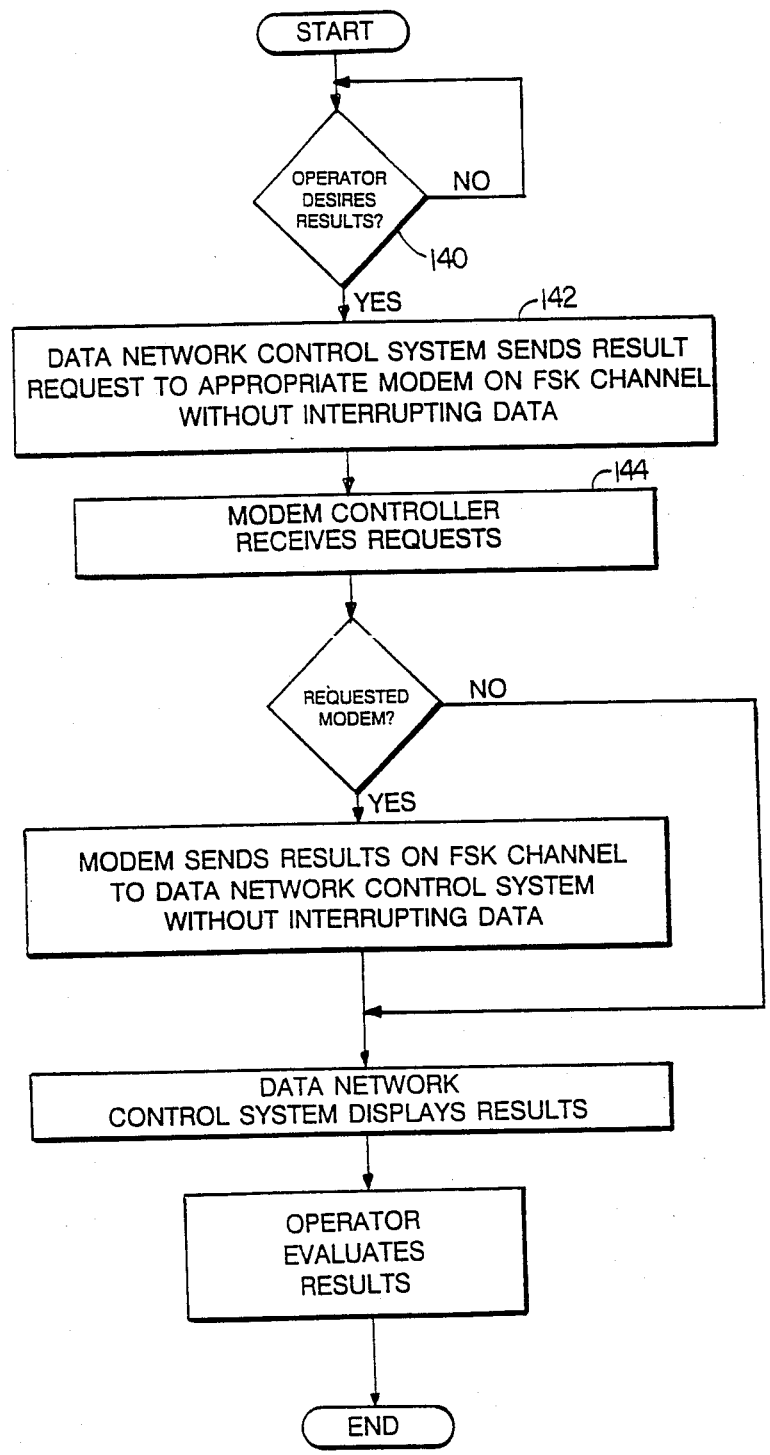
FIG. 5 is a flow chart of the retrieval of test results.

Referring to FIG. 5, after the test is performed, if the operator wishes to see the results (140), the DNCS sends the request for results to the appropriate modem on the FSK channel without interrupting data (142). Each modem controller receives the request (144), determines if it is the modem from which results are requested (146) and if so sends the results on the FSK channel to the DNCS without interrupting data. The DNCS then displays the results (150) for operator evaluation (152).

In order to govern the switching of the signal processor between processing customer data and testing, the host processor in modem 12 holds a DNCS command table that lists all of the non-test and test commands to which the modem can respond and associates with each command the code necessary to execute it. The host processor also holds an existence table that indicates which modes (e.g., test mode, and one or more customer data modes) which the modem is able to operate in and associates with each mode the software needed by the signal processor (e.g., data mode software, or test mode software) to operate in that mode. Thus, for example, to execute a DNCS begin test command, the host processor identifies the command in the command table, and executes the associated code, thus stopping the signal processor, loading its memory with the test program, and restarting the signal processor.

Other embodiments are within the following claims. For example, a slave modem can be connected via a digital link to a tail circuit having another master modem and associated slave modems. Then the testing could be triggered from the original DNCS to occur between the additional master and any of the additional slave modems.

We claim:

1. Apparatus for quantitatively testing the performance of a communication line that carries customer data in both directions between two modems, said communication line carrying both customer data and a test command for controlling said testing, said apparatus comprising a digital signal processor in each said modem coupled to said communication line for performing both digital modulation and demodulation of customer data carried on said line in accordance with a data program, and a series of quantitative tests of said line in accordance with a test program using test signal tones generated digitally, and in each said modem a programmable host processor separate from and coupled to said digital signal processor and responsive to said test command for selectively causing said digital signal processor to switch between performing said modulation and demodulation of customer data and said performing said series of quantitative tests.

2. The apparatus of claim 1 further comprising a plurality of said modems coupled to said communication line to form a data network and a central network controller coupled to said communication line for providing said test command.

3. The apparatus of claim 2 wherein each said test command names two of said modems to participate in said testing, and said modem controller in each of said plurality of modems identifies whether each said modem is one of said participants.

4. The apparatus of claim 3 wherein said communication line of said network carries progress signals indicating that the testing is in progress, while said testing is in progress, said modem controllers in all said modems being responsive to said progress signals to cause said modems to cease modulating and demodulating customer data while said testing is in progress with all modems other than said two modems monitoring said network for said progress signals and again modulating and demodulating customer data when said progress signals cease to appear.

5. The apparatus of claim 2 wherein said central network controller generates a clear test command to indicate the end of the test, and one of said two modems responds to said clear test command by passing a clear test indication over said communication line to the other one of said two modems.

6. The apparatus of claim 5 wherein said clear test indication is passed by said one modem dropping a carrier signal for a period that is longer than a nominal quiescent period during said testing.

7. The apparatus of claim 1 wherein said central network controller discontinues the carrying of said customer data and said network control commands over said communication line temporarily beginning after said test command is received.

8. The apparatus of claim 1 further comprising a central network controller for said test command via said communication line to said two modems and wherein said modems return the results of said testing to said central network controller.

9. The apparatus of claim 1 wherein said line comprises a telephone line.

10. The apparatus of claim 1 wherein said customer data and said network control commands are respectively carried in two channels simultaneously over the same said communication line.

11. The apparatus of claim 10 wherein said customer data is carried in phase shift keyed form in a channel above 600 Hz.

12. The apparatus of claim 10 wherein said network commands are carried in frequency shift keyed form in a channel below 500 Hz.

13. The apparatus of claim 10 wherein said testing applies to both said channels.

14. The apparatus of claim 1 wherein said two modems each sends synchronizing signals to the other said modem on said communication line to synchronize said testing, and controls said testing based on said synchronizing signal received from the other said modem.

15. The apparatus of claim 14 wherein said communication line is characterized by a delay time for delivery of signals between said two modems, each said processor sends said test signals following said synchronizing signals, and said test signals are delayed, following said synchronizing signals, by a period longer than said delay time.

16. The apparatus of claim 1 wherein said performance includes signal-to-noise ratio.

17. The apparatus of claim 1 wherein said performance includes phase jitter.

18. The apparatus of claim 1 wherein said performance includes message noise.

19. The apparatus of claim 1 wherein said performance includes amplitude distortion.

20. The apparatus of claim 1 wherein said performance includes a delay of an envelope of a test signal.

21. The apparatus of claim 1 wherein said performance includes harmonic distortion.

* * * * *